Aug. 22, 1961 D. F. DAY ET AL 2,997,337
MOTOR VEHICLE BODY FOLDABLE TOP
Filed March 28, 1958 3 Sheets-Sheet 1
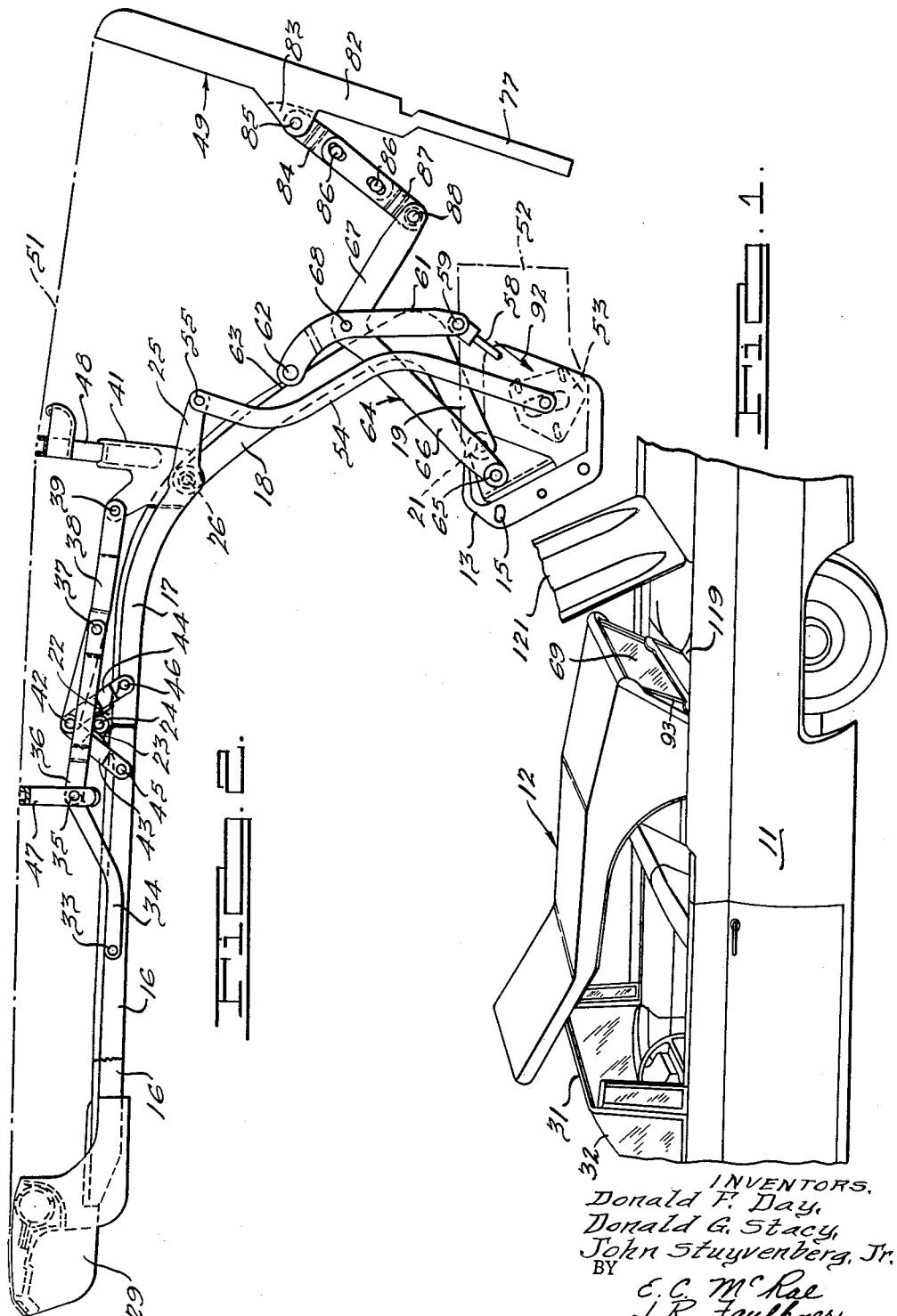
INVENTORS.
Donald F. Day,
Donald G. Stacy,
John Stuyvenberg, Jr.
BY E.C. McRae
J.R. Faulkner
J.H. Oster
ATTORNEYS.

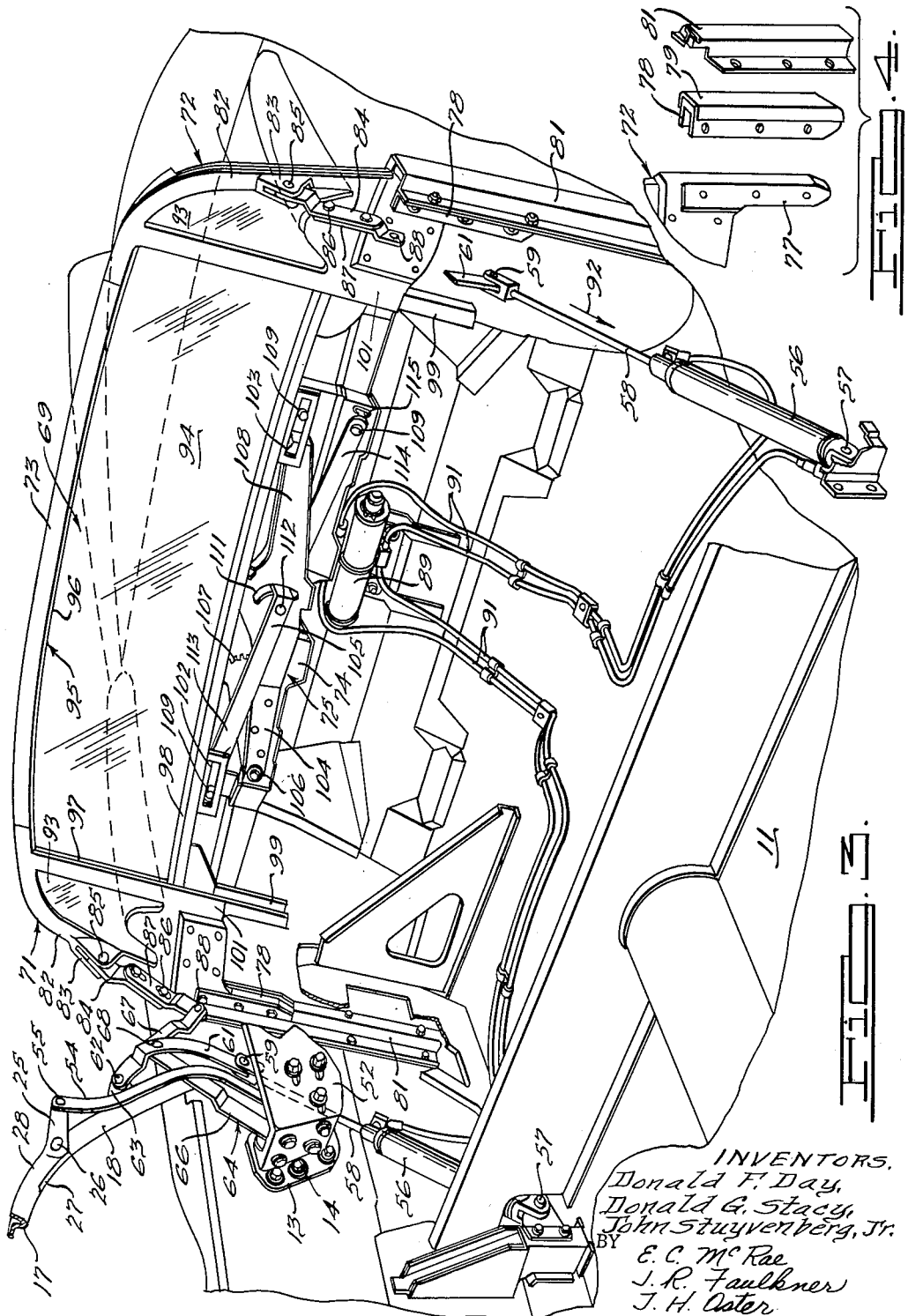

Aug. 22, 1961     D. F. DAY ET AL     2,997,337
MOTOR VEHICLE BODY FOLDABLE TOP
Filed March 28, 1958        3 Sheets-Sheet 3
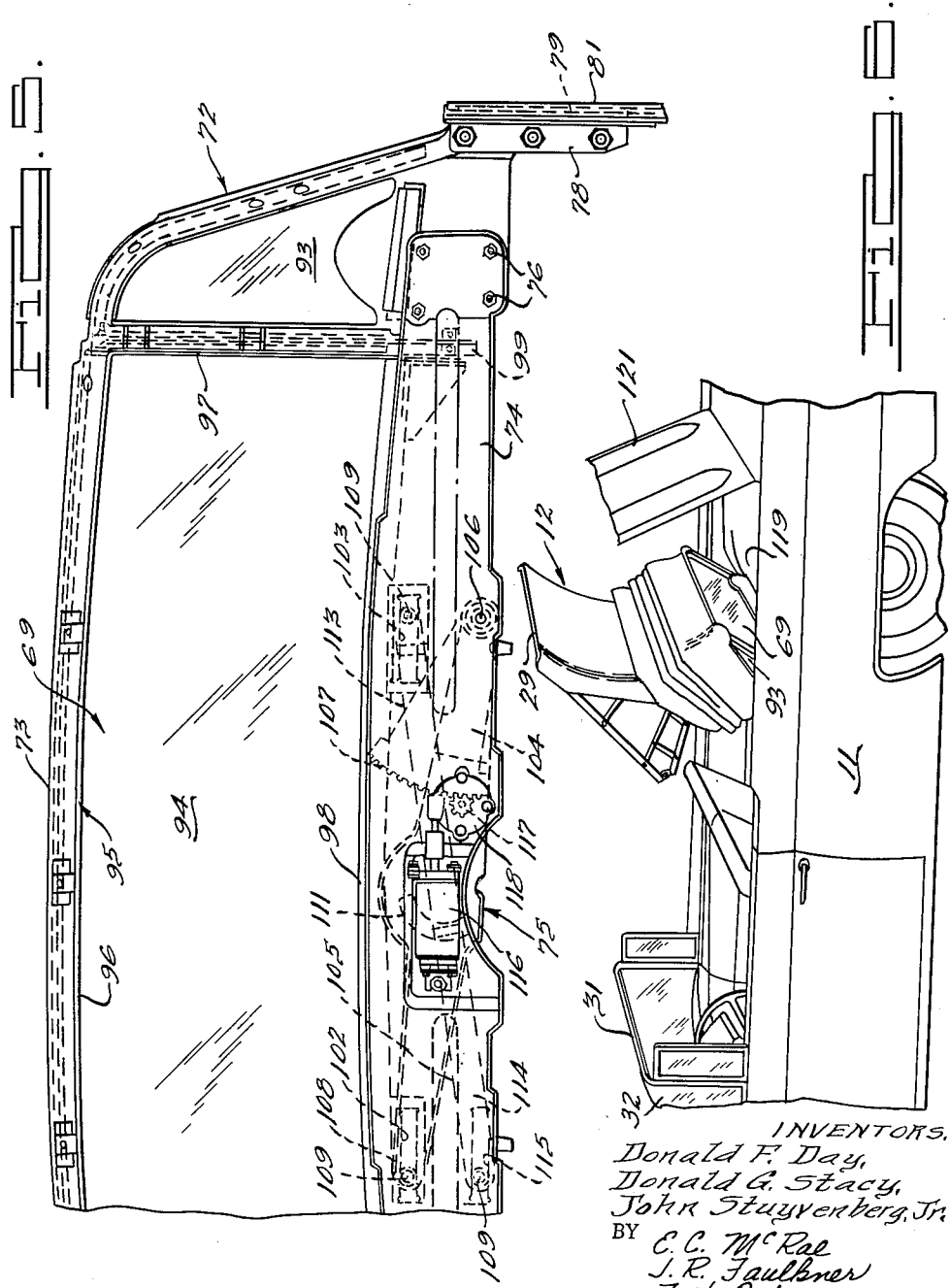
INVENTORS.
Donald F. Day,
Donald G. Stacy,
John Stuyvenberg, Jr.
BY C. C. McRae
J. R. Faulkner
J. H. Oster
ATTORNEYS.

United States Patent Office 2,997,337
Patented Aug. 22, 1961

2,997,337
MOTOR VEHICLE BODY FOLDABLE TOP
Donald F. Day and Donald G. Stacy, Detroit, and John Stuyvenberg, Jr., Livonia, Mich., assignors to Ford Motor Company, Dearborn, Mich., a corporation of Delaware
Filed May 28, 1958, Ser. No. 724,708
8 Claims. (Cl. 296—107)

This invention relates to motor vehicle bodies of the convertible type, particularly those provided with a foldable top.

In recent years, motor vehicle bodies featuring foldable tops have lost some of their popularity to the so-called hard top body types. The popularity of the hard top models has been the result, to some extent, of the greatly increased range of visibility from within the passenger compartment obtained through the large window glass area made possible by the reduction in size of the corner body pillars and the elimination of the usual center body pillars. Regular convertibles have completely unobstructed vision to the sides and rear when the top structure is folded and stowed away within the body. However, when the top structure is in a raised position the range of visibility to the rear has heretofore been highly restricted. The rear window or back light generally has comprised small piece of semi-flexible transparent material intended to lie flat between the folds of the top material when the latter is folded. To provide for ventilation through the rear of the top, it is generally necessary to manually unfasten the transparent section retaining devices. The replacement of the section is generally a slow and laborious process usually made more difficult by being done under adverse weather conditions.

It is an object of the present invention to provide a vehicle body foldable top construction and arrangement whereby the visibility range through the rear window is greatly increased. More particularly, the rear window structure embodying the present invention comprises a framework which forms the rear bow of the foldable top. The roof bow framework is constructed and arranged to provide a support and guiding means for a window or transparent panel structure bodily movable with and independently of the framework. The vehicle body is provided with means guiding and supporting the roof bow framework, including the window panel structure, for movement into and out of a storage compartment. This movement of the roof bow is controlled by an extension of the linkage system which controls the folding or unfolding of the top and is thereby coordinated with the movement of the top.

Other objects, advantages and features of this invention will be made more apparent as this description proceeds, particularly when considered in connection with the accompanying drawings, wherein:

FIG. 1 is a side elevation of part of a motor vehicle of the convertible type showing the storage compartment lid in a raised position and the foldable top in the initial stages of folding movement.

FIG. 2 is an enlarged side elevational view of the linkage system on one side of the top supporting structure showing the positions of the links when the top is in raised position;

FIG. 3 is an interior perspective view illustrating the construction and arrangement of the rear top supporting bow and the window structure associated therewith;

FIG. 4 is an exploded view illustrating some of the structural details of a part of FIG. 3;

FIG. 5 is a fragmentary elevational view illustrating the rear bow and window mechanism from the rear thereof, the side opposite to that shown in FIG. 3;

FIG. 6 is a view in part similar to FIG. 1 illustrating the top near the end of the folding operation.

Referring now to the drawings, and particularly to FIG. 1, there is illustrated a motor vehicle body 11 of the convertible type having a foldable top, generally designated 12. The foldable top 12 is supported by a system of side rails located at each side of the top. Except as will be hereinafter described, the side rail system has the general characteristics of the side rail system disclosed in Hawver et al., Patent 2,617,681, issued Nov. 11, 1952. Accordingly, and inasmuch as both sides of the folding top are identical, except for being reversed, only one side will be described in detail.

Referring now to FIGS. 2 and 3, as well as FIG. 1, a supporting bracket 13 is secured to the vehicle body 11 by bolts 14, the openings 15 in the brackets for the bolts 14 being enlarged to permit limited adjustment of the bracket on the body during assembly. Three side rails are provided at each side of the top, these being the front side rail 16, the center side rail 17, and the rear side rail 18. While each of these side rails may be constructed in any desirable manner, they preferably comprise permanent mold aluminum castings and form a strong rigid structure. The rear side rail 18 is cast into a substantially reversed L-shaped form with the free end of the base leg 19 being pivotally connected to the supporting bracket 13 by means of a pivot pin 21.

The center side rail 17 is provided at its forward end with an integral clevis portion 22 embracing the tongue 23 formed on the rearward end of the front side rail 16, and pivotally connected thereto by means of a pivot pin 24. It will be noted that the pivotal connection 24 between the front and center side rails 16 and 17 is located above the upper edges of the rails permitting the ends of the rails to abut each other directly beneath the pivotal connection in the extended or unfolded position, as shown in FIG. 2.

At its rearward end the center side rail 17 is formed with an integral extension 25 laterally offset from the main body portion of the rail. The offset extension 25 is pivotally connected by means of a pivot pin 26 to the upper end of the rear side rail 18. The center and rear side rails 17 and 18 are formed with abutting portions 27 and 28, respectively (see FIG. 3), so that in raised position of the top the main body portions are in alignment and form a continuous rail.

The front side rail 16 carries at its forward end a conventional header 29 adapted to engage and be secured to the frame 31 of the windshield 32 when the top is raised.

Intermediate its ends the front side rail 16 is provided with a pivot pin 33. The pivot pin 33 forms a pivotal mounting for the forward end of a link 34, the rearward end of which is pivotally connected at 35 to the forward end of a second link 36. The link 36 is, in turn, pivotally connected at 37 to an intermediate portion of a third link 38. The link 38 is pivotally supported at its rear end on a pivot pin 39 connected to the upper end of a forwardly and upwardly extending flange 41 on the forward end of the rear side rail 18. At its forward end the link 38 is pivotally connected by a pivot pin 42 to two short links 43 and 44. The link 43 is pivotally connected at 45 to the front rail 16 and the link 44 is pivotally connected at 46 to the center rail 17.

The links 34 and 36 control the folding action of the front and center side rails 16 and 17 during the lowering of the top, the links being actuated during this operation by the link 38.

It will be noted that at the pivotal connection of the links 34 and 36, a roof bow 57 is provided. A second roof bow 48 is connected to the flange 41 of the rear side rail 18. A third roof bow 49 is also provided, the features of construction of this roof bow being an important part of the present invention and to be fully described later. A suitable fabric top 51, shown in phantom in FIG. 2, interconnects the header 29, the roof bows 47 and 48, and the roof bow 49.

Referring now to FIGS. 2 and 3, the supporting bracket 13 is provided with a spaced side portion 52 paralleling the inner compartment wall on which the bracket 13 is mounted. Secured to the inner side of side portion 52 is an adjustable plate 53 which provides an anchor or mounting for the lower end of a balance link 54. The balance link may be secured to the adjusting plate 53 in any convenient manner. The upper end of the balance link 54 is connected by means of pivot pin 55 to the rearward extremity of the integral extension 25 of the center side rail 17.

The folding top of the present invention is designed for power operation by means of a hydraulic cylinder assembly 56, although other power means can also be used. The lower end of the cylinder assembly 56 is pivotally connected at 57 to the vehicle body 11 at a point diagonally forwardly and downwardly from the supporting bracket 13. The piston rod 58 of the cylinder assembly 56 is pivotally connected at 59 to the lower end of a power link 61, the upper end of which is pivotally connected by means of a pin 62 to an upwardly extending flange 63 formed on the upper surface of the rear side rail 18 intermediate its ends. A swinging strut 64 is provided between the fixed supporting bracket 13 and the power link 61, the lower end of the strut being pivotally connected to the bracket by means of the pivot pin 65. It will be noted that the swinging strut is an inverted L-shaped member having a section 66 and a section 67. The strut is pivotally connected by a pivot pin 68 to the power link 61 intermediate the ends thereof.

As was noted above, important features of the present invention involve the third roof bow 49. The roof bow 49 as embodied in the present invention does not have a folding motion, as in conventional foldable top structures. Instead, the roof bow 49 is mounted for movement into and out of the vehicle body shell. Further, the roof bow 49 provides a framework for a transparent panel, generally designated 69. Mechanism is provided for moving the transparent panel independently of the roof bow 49. These features are shown in greatest detail in FIGS. 3 and 5 and reference is now made thereto.

The roof bow 49 comprises a framework made up of two side units 71 and 72 joined at the top by a center rail 73. The side units are preferably of cast aluminum and the center rail 73 is a steel channel-shaped member, suitable fastening devices (not shown) being used to connect the side units and center rail together. The side units 71 and 72 are further braced and maintained in proper spaced relation by a panel 74 which also provides a support for a window regulator mechanism 75 to be described. The panel 74 is secured to the lower portions of the side units 71 and 72 by suitable bolts 76.

Each side unit is provided at its lower outer corner with a downwardly extending appendage 77 to which is bolted or otherwise securely fastened a channel-shaped member 78 having attached thereto a nylon slide or shoe 79. Each slide or shoe 79 is slidably engaged with a track member 81 fastened to the inner panel of the vehicle body at each side thereof. The entire roof bow 49 structure may thus be moved up and down substantially into and out of the vehicle body along the track members 81.

Retracting and raising movement of the roof bow 49 is coordinated with the folding movement of the top structure 12. It will be noted that the outer rail portion 82 of each side unit is provided with a clevis shaped protuberance or flange 83 adapted to receive the upper end of a link 84, the latter being connected to the rail by a pivot pin 85. The link 84 overlies and is adjustably bolted by bolts 86 to a second link 87, the latter being pivotally connected at 88 to the free end of the leg 67 of the swinging strut 64.

The operation of the foldable top 12 and the coordinated movement of the roof bow assembly 49 may be described as follows, the movement being from a top up to a top retracted position:

Hydraulic fluid under pressure is furnished by a motor and pump unit 89 (see FIG. 3) through suitable condits 91 to the hydraulic cylinders 56 at each side of the vehicle body. In the folding direction each piston rod 58 tends to move inwardly, in the direction of the arrow 92, thereby applying a force to power link 61 at the pivot connection 59. This power or force application results in the power link 61 being swung about the fulcrum provided by its pivotal connection 68 with the upper end leg 66 of the swinging strut 64. Since the upper end of the power link 61 is connected at 62 to the rear side rail 18, the power link applies a turning couple or torque tending to swing the rear side rail 18 in a clockwise direction. Continued retraction of the piston 58 causes the power link 61 to be pulled down and around the pivot center 65. The effect of the balance link 54 is to first exert an upward force at the pivot point 55 on the offset portion 25 of the center side rail tending to swing this rail in a counterclockwise direction about the pivotal connection 26. But even before this movement is noticeable in the top, the bodily shiftable movement in a clockwise direction about the pivot axis 21 of the flange 41 on the forward end of the rear side rail 18 manifests itself in a pulling force being exerted on the link 38. This force is transmitted to the links 36 and 43 causing the forward section of the top to be raised, as shown in FIG. 1. It will be understood that the header 29 will have been unlocked from the windshield frame 31 either by manual or power operated means. In FIG. 5 the top is illustrated in its final stages of closing movement.

As the swinging strut 64 is pulled down and around in a clockwise direction about the pivot axis 65, the arm section 67 thereon is exerting a downward pull on the links 84 and 87 connecting the free end of the arm 67 of the link 64 to the roof bow 49. It will be noted that the longitudinal axis of the links 84 and 87 is only at a slight angle to the longitudinal axis of the guide track member 81. Because of this minimum angular relationship and because of the length of the shoes 79, there is little tendency of the roof bow 49 to cock or otherwise resist downward movement. The further down the track members the roof bow 49 moves, the less the angular relationship becomes.

The application of power through the power link 61 cooperating with the swinging fulcrum strut 64, the latter also being utilized to actuate the movement of the roof bow, provides a simple yet effective control for the folding top 12 and its rear roof bow 49.

In the present embodiment the roof bow side units 71 and 72 are forwardly curved to provide a slight wraparound effect. Each side unit is provided with a transparent pane or window glass 93. As was briefly mentioned above, the roof bow 49 provides a framework for a large transparent panel, generally designated 69. The panel 69 comprises a window glass 94 housed in a suitable frame 95 having an upper rail 96, side rails 97 and a lower horizontal rail 98.

The side rails 97 are slidable in conventional guide channels 99 suitably fastened to the inner vertical members 101 of the side units 71 and 72. The lower horizontal rail 98 of the frame 95 is provided with a pair of horizontal guide or channel members 102 and 103.

The window structure 69 is adapted to be raised and lowered by the window regulator mechanism, which earlier has been designated 75. As illustrated, the mechanism comprises a pair of crossed arms 104 and 105 of equal length. The power arm 104 is mounted at one end for pivotal movement about a fixed pivot stud 106 pivotally secured to the window regulator mounting panel 74. The power arm 104 is coupled through the pivot stud 106 to a gear sector 107. The opposite end 108 of the power arm is provided with a roller or retainer assembly 109 operatively coupled to the guide member 102. The balance arm 105 extends through an arcuate slot 111 in the power arm 104 and is pivoted at 112 to the midpoint of the power arm. The end 113 of the balance arm in alignment with the pivoted end of the power arm 104 is also provided with a roller or retainer assembly 109 operatively coupling the arm end to the guide member 103. The opposite end 114 of the balance arm is coupled by a retainer assembly 109 to a fixed channel-shaped guideway 115 secured to the regulator mounting panel 74.

The gear sector 107 may be driven in any convenient manner, the drawing showing a power actuated regulator in which an electric motor 116 drives a pinion gear 117 through a gear box 118. The motor 116 is mounted on the regulator mounting panel 74 in any convenient manner.

The top 12 in its folded position is adapted to be stored in a storage compartment 119. The storage compartment 119 is adapted to be closed by a hinged compartment cover 121. The compartment cover may be moved between open and closed position in any convenient manner, either by manual operation or power operation.

Although none of the electrical control circuitry is illustrated, it will be readily understood that the electric motor of the motor and pump unit 89, the motor 116 of the window regulator, and any other motors such as may be used in a power operated header lock or a power operated storage compartment cover will be electrically interlocked through the electrical circuits. The circuits will, of course, include a number of limit switches controlling the range of movement of the various parts of the top mechanism and also preventing operation of units out of proper sequence.

Of importance to the present construction and arrangement is the control of the foldable top with relation to the position of the transparent panel or window structure 69, or, conversely, the control of the window structure 69 with relation to the position of the top. In other words, with the vehicle top 12 in a raised position, the transparent panel or window structure may be raised or lowered at will. However, if the top is in a folded condition with the roof bow 49 retracted into the body, there is no room or purpose for lowering the panel 69 relative to the roof bow 49. The circuit to the window regulator motor 116 is preferably inoperative as soon as the top is operated to be folded. It will be readily apparent that the position of the transparent panel 69 should also conversely control the operability of the top. That is, folding movement of the top 12 is inhibited if the panel 69 is in a down position independently of the roof bow 49. Accordingly, the circuits may be interlocked to first cause the panel 69 to be raised, if not in a raised position, before the folding movement of the top 12 can begin. The electrical interlock of the limit switches is conventional and the foregoing brief explanation is believed sufficient.

The foregoing described rear bow structure with its wide expanse of glass provides a greatly increased range of vision through the convertible top when the latter is in a raised position. Further, the mounting of the glass in a frame movable up and down relative to the roof bow is vastly more efficient than the conventional system of snapping a piece of transparent material into an opening in the rear panel of the foldable top when it is desired to protect the passenger compartment from inclement weather.

It will be understood that the invention is not to be limited to the exact construction shown and described, but that various changes and modifications may be made without departing from the spirit and scope of the invention, as defined in the appended claims.

What is claimed is:

1. In a foldable top for a motor vehicle body, a rear bow structure, guide means on said body engaged by elements of said rear bow structure linearly guiding the latter into and out of said vehicle body as said top structure is folded and unfolded relatively thereto, said vehicle body being provided at each of its sides with a rear side rail having its rearward end pivotally mounted on said body and extending generally forwardly and upwardly from its pivotal mounting in the raised position of the roof, a strut having one end pivotally mounted on said body and its other end connected to said rear bow structure, a power link having one end pivotally connected to said rear side rail and an intermediate portion pivotally connected to an intermediate portion of said strut, said strut forming a movable fulcrum for said power link, and power means operatively connected to the opposite end of said power link to actuate the latter to simultaneously swing said rear side rail and linearly move said rear bow structure between raised and lowered positions.

2. In a foldable top for a motor vehicle body, a rear bow providing partial support for said foldable top structure, guide means on said body engaged by elements of said rear bow for guiding the latter for up and down movement into and out of said vehicle body as said top is folded and unfolded relatively thereto, each side of said vehicle body being provided with a rear side rail having its rearward end pivotally mounted on said vehicle body, each rear side rail extending generally forwardly and upwardly from its pivot axis in the raised position of the roof, additional bows carried on said side rails supporting the remainder of said top, a strut having one end pivotally mounted on said body and its other end connected to said rear bow, a power link having its upper end pivotally connected to said rear side rail and an intermediate portion pivotally connected to said strut intermediate the ends thereof, the portion of said strut between its pivotal connection to said body and its pivotal connection to said power link forming a movable fulcrum for said power link, and power means operatively connected to the lower end of said power link to swing the latter about its pivotal connection with said strut to swing said rear side rail and bodily swing said strut about its pivotal connection to said vehicle body to move said rear bow whereby both said rear side rail and rear bow are moved between raised and lowered positions.

3. In a foldable top for a motor vehicle body, a rear bow providing partial support for said foldable top structure comprising a rigid framework, guide means on said body engaged by side members of said framework for guiding said rear bow for up and down movement into and out of said vehicle body as said top is folded and unfolded relative thereto, each side of said vehicle body being provided with a rear side rail having its rearward end pivotally mounted on said vehicle body, each rear side rail extending generally forwardly and upwardly from its pivot axis in the raised position of the roof, said pivot axis being located in forwardly spaced relationship to said rear bow guide means, additional bows carried on said side rails supporting the remainder of said top, a strut having one end pivotally mounted on said body and its other end connected to said rear bow, a power link having its upper end pivotally connected to said rear side rail and an intermediate portion pivotally connected to said strut intermediate the ends thereof, the portion of said strut between its pivotal connection to said body and its pivotal connection to said power link forming a movable fulcrum for said power link, and power means operatively connected to the lower end of said power link to swing the latter about its pivotal connection with said strut to swing said rear side rail and bodily swing said strut about its pivotal connection to said vehicle body to move said rear bow whereby both said rear side rail supported bows and rear bow are moved between raised and lowered positions.

4. In a foldable top structure for a motor vehicle body, a rear bow framework for said foldable top structure, guide means on said body engaged by saide members of said framework for substantially vertically guiding said rear bow into and out of said vehicle body as said top structure is folded and unfolded, each side of said vehicle body being provided with a rear side rail, bracket means mounted on said vehicle body forwardly of said guide means on said body engaged by side members of side rail having its rearward end pivotally mounted on said bracket means and extending generally forwardly and upwardly from the pivotal mounting in the raised position of the roof, a strut having one end pivotally mounted on said bracket means and its other end connected to said rear bow, a power link having one end pivotally connected to said rear side rail and in intermediate portion pivotally connected to said strut intermediate the ends thereof, the portion of said strut between said bracket means and power link forming a movable fulcrum for said power link, and power means operatively connected to the opposite end of said power link to bodily shift and swing the latter about said movable fulcrum to swing said rear rail between raised and lowered positions, said strut during movement thereof causing corresponding movement of said rear bow framework out of and into said vehicle body.

5. In a foldable top structure for a motor vehicle body, a rear bow framework for said foldable top structure, guide means on said body engaged by side members of said framework for substantially vertically guiding said rear bow into and out of said vehicle body as said top structure is folded and unfolded, each side of said vehicle body being provided with a rear side rail, bracket means mounted on said vehicle body forwardly of and in longitudinally spaced relation to said guide means, each rear side rail having its rearward end pivotally mounted on said bracket means and extending generally forwardly and upwardly from the pivotal mounting in the raised position of the roof, a strut having one end pivotally mounted on said bracket means and its other end connected to said rear bow, a power link having its upper end pivotally connected to said rear side rail and in intermediate portion pivotally connected to said strut intermediate the ends thereof, the portion of said strut between said bracket means and power link forming a movable fulcrum for said power link, and power means operatively connected to the lower end of said power link to bodily shift and swing the latter about said movable fulcrum to swing said rear rail between raised and lowered positions, said strut during movement thereof causing corresponding movement of said rear bow framework out of and into said vehicle body whereby said side rails are collapsed above said framework.

6. In a motor vehicle body having a foldable top the forward portion of which is secured to roof bows carried in top raised position on generally upwardly and forwardly extending collapsible side rails, means pivotally mounting said side rails at their rearward ends on said vehicle body, a roof bow spaced rearwardly of the rearmost of the roof bows carried by said side rails to which the remaining portion of said foldable top is secured, means independent of the means pivotally mounting said side rails supporting and guiding said last mentioned roof bow on said vehicle body for slidable movement into and out of said vehicle body, a common linkage system coupled to said side rails and roof bow and power operated means for actuating said link means to simultaneously swing said side rails and slidably move said last mentioned roof bow to move said top between raised and lowered positions, said last mentioned roof bow comprising a framework, window means carried by said framework, and means supporting and guiding said window for raising and lowering movement independently of said framework.

7. In a motor vehicle body having a foldable top the forward portion of which is secured to roof bows carried in top raised position on generally upwardly and forwardly extending collapsible side rails, means pivotally mounting said side rails at their rearward ends on said vehicle body, a roof bow spaced rearwardly of the rearmost of the roof bows carried by said side rails to which the remaining portion of said foldable top is secured, means independent of the means pivotally mounting said side rails supporting and guiding said last mentioned roof bow on said vehicle body for slidable movement into and out of said vehicle body, a common linkage system coupled to said side rails and roof bow and power operated means for actuating said link means to simultaneously swing said side rails and slidably move said last mentioned roof bow to move said top between raised and lowered positions, said last mentioned roof bow comprising a framework, window means carried by said framework, and means supporting and guiding said window for raising and lowering movement independently of said framework, said window being movable only in the raised position of said framework.

8. In a foldable top structure for a motor vehicle body, said top structure including linkage means for folding and unfolding the same, means pivotally mounting said linkage means on said vehicle body, a rear bow for said top structure comprising a framework, means movably mounting said framework on said vehicle body independently of the means pivotally mounting said linkage means, movable window means carried by said framework, connecting linkage means connecting said framework to said top structure linkage means, and power operated means adapted to actuate said connecting linkage means to move said framework into and out of said vehicle body as said top is folded and unfolded relative thereto.

References Cited in the file of this patent

UNITED STATES PATENTS

| | | |
|---|---|---|
| 1,935,468 | Dittus | Nov. 14, 1933 |
| 1,996,595 | Smith | Apr. 2, 1935 |
| 2,593,360 | Sulkowski | Apr. 15, 1952 |
| 2,704,225 | Anschuetz | Mar. 15, 1955 |
| 2,798,763 | Dujec | July 9, 1957 |
| 2,833,593 | Olivier | May 6, 1958 |
| 2,836,457 | Beerman et al. | May 27, 1958 |